United States Patent [19]

Weber

[11] Patent Number: 4,612,633
[45] Date of Patent: Sep. 16, 1986

[54] SONAR APPARATUS WITH MEANS TO TRANSMIT AND PRINT ON ALTERNATE CYCLES

[75] Inventor: Ronald G. Weber, Tulsa, Okla.
[73] Assignee: Lowrance Electronics, Inc., Tulsa, Okla.
[21] Appl. No.: 509,934
[22] Filed: Jul. 1, 1983
[51] Int. Cl.$^4$ ............................................. G01S 15/96
[52] U.S. Cl. ..................................................... 367/115
[58] Field of Search .............................. 367/115, 109
[56] References Cited
U.S. PATENT DOCUMENTS

| 2,350,994 | 6/1944 | Anderson | 367/115 |
|---|---|---|---|
| 2,610,244 | 9/1952 | Wolf | 367/115 |
| 3,013,246 | 12/1961 | Bolzmann | 367/115 |
| 3,852,705 | 12/1974 | Backman, Jr. et al. | 367/115 |
| 4,013,991 | 3/1977 | Balcom | 367/109 |
| 4,186,372 | 1/1980 | Maloy | 367/115 |

Primary Examiner—Richard A. Farley
Attorney, Agent, or Firm—Head, Johnson & Stevenson

[57] ABSTRACT

A sonar system for indicating the presence of sonic energy reflecting interfaces in the water in the path of a downgoing sonic pulse. The received reflection or echo is recorded on a moving record or web by means of a stylus that is traversed across the web as a linear function of time. The movement of the stylus triggers the transmitted pulse and the received signal is then amplified and controls a high voltage source which generates a series of pulses applied by the stylus as it moves across the record. Under certain operating conditions there is considerable noise generated in the water by the sonic pulse due to the presence of many reflecting surfaces from sediment, algae, plankton, etc. which sustains the return signal to the transducer. A disable system is provided which on command of the operator will disable the operation of the transmitter and receiver on alternate operating cycles to provide time for this noise to attenuate.

1 Claim, 1 Drawing Figure

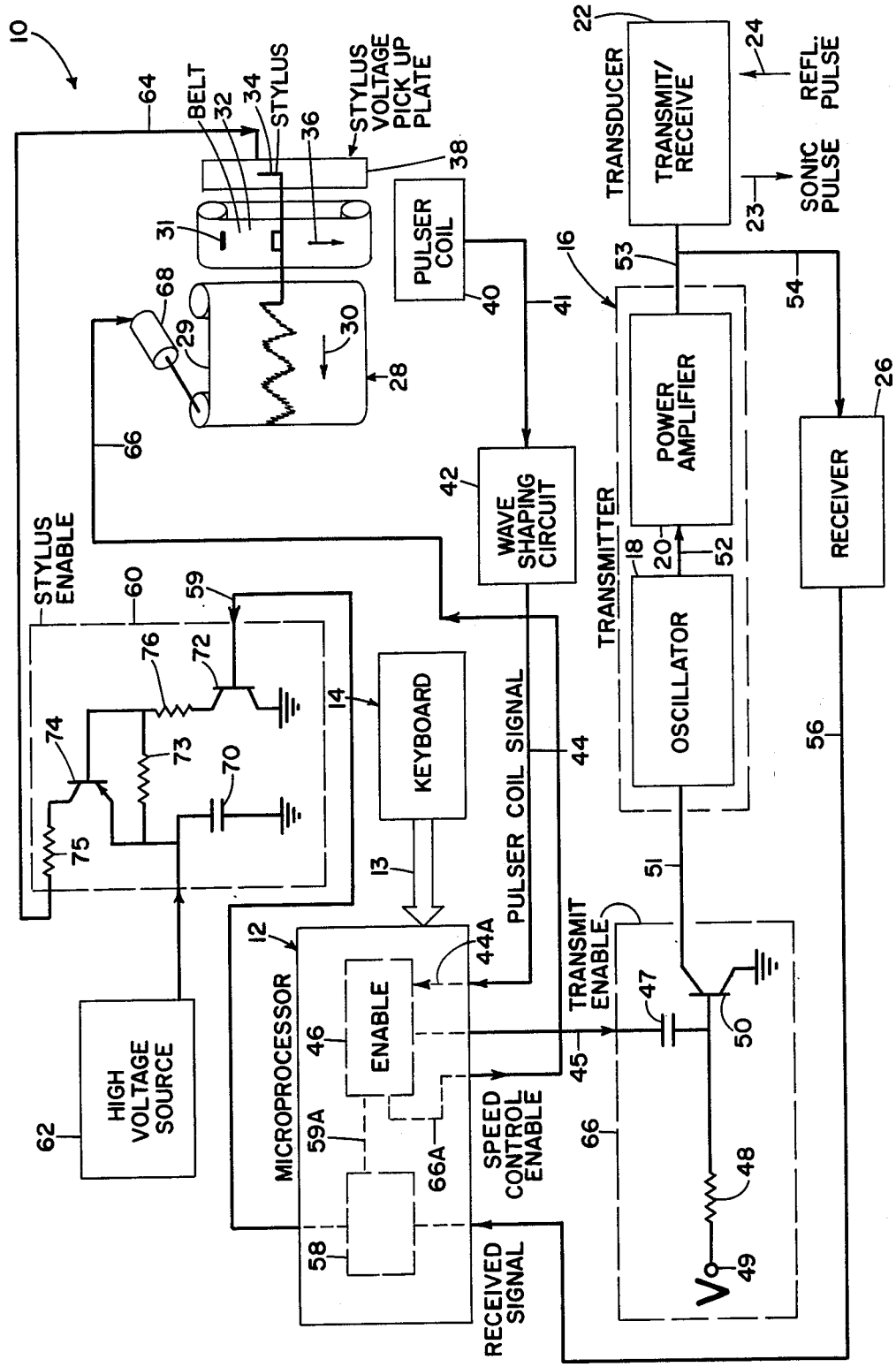

SONAR APPARATUS WITH MEANS TO TRANSMIT AND PRINT ON ALTERNATE CYCLES

CROSS REFERENCE TO RELATED PATENT

Reference is made to the U.S. Pat. No. 4,186,372 issued Jan. 29, 1980 in the name of Malloy. This patent clearly describes the construction of a sonic received signal recorder such as would be utilized in the recording system to which this invention is applied. U.S. Pat. No. 4,186,372 is included by reference into this application.

BACKGROUND OF THE INVENTION

This invention relates to sonar devices, used on a boat to indicate the presence of sonic energy reflecting interfaces, such as those caused by the presence of fish and the water bottom. More particularly, this invention pertains to a solid state sonar apparatus for providing a printed output of the received signal resulting from the downward propagation of a high frequency sonic pulse.

A commonly employed means of measuring and indicating the depth in water below a boat of the presence of sonic energy reflecting interfaces, is a sonar apparatus. Sonar devices functions by generating sequential bursts of sonic energy into the water directed downwardly, and receiving energy reflected from intermediate interfaces of objects such as fish and also a reflection from the bottom of the water. The received energy reflected from these interfaces provides, by its travel time, means for determining the depths to the reflecting interfaces. This is the time span which elapses between the transmission of a sonic pulse until the reception of a reflected signal. The reflected signal is recorded as a trace by a moving stylus, which is controlled to move transverse to the movement of the record.

In the prior art a method frequently employed for indicating depths utilizes a rotating disc having a small gas-filled tube carried by the disc which is illuminated when a reflection echo is received. A pulse of sonic energy is transmitted at the beginning of each revolution of the disc and thereby the depths of the water down to the relecting interface in which the instrument is used is indicated by the angular displacement of the tube at the time it is flashed by the received signal.

Other devices for indicating depth includes the use of a current meter in which the depth is indicated by the magnitude of current flow through the meter. A linearly increasing current is provided and passed through the meter starting at the transmission time of the sonic pulse. The reading of the meter at the time the reflection signal is received would then be a measure of depth to that reflecting interface. This depth is proportional to the time duration required for the transmission of the sonic pulse and the received reflection.

A third type of depth indicator is a chart readout in which a moving scriber or stylus passes over a record and is energized to mark on the record in response to the received reflected signals. The markings on the record can be compared with depths indicated on the charts as a means of indicating the position or depth of the reflecting interfaces.

In the conventional sonar system in which the returned reflected signal is recorded by a stylus moving across a sheet of record paper, which is treated with a chemical substance such that when a high voltage is applied by means of a wire stylus to the paper, part of the chemical material is altered to a black color so that a black dot is printed on the sheet.

A cycle of operation of the sonar begins with a pulse generated by the movement of a magnet attached to a belt which also carries the stylus. The magnet cooperates with a pulsor coil to generate a voltage pulse. This voltage pulse is amplified and shaped and initiates the application of voltage to an oscillator and power amplifier. The high voltage, high frequency electrical pulse then operates the transducer to generate a pulse of sonic energy which goes out into the water. When this pulse of sonic energy hits a sonic reflecting surface it will generate a reflected sonic signal, which travels back to the transducer and is converted to an electrical signal. This passes to a receiver which detects and amplifies the signal, and the amplified reflection signal then goes to a high voltage source to generate the pulses for marking the records in accordance with the return of reflected signals.

Because of mechanical limitations the time of travel by the stylus across the record sheet is roughly one-third of the time for one complete cycle of the belt. Therefore, the length of time taken by the stylus to draw a single path across the record sheet is approximately one-third the period of revolution of the belt and of a single operating cycle of the sonar.

After the trace has been recorded and the stylus passes off of the record sheets, any further return pulses cannot be recorded, of course. However, a very long delayed pulse that is a reflection from a very deep bottom may come back and arrive at the transducer at slightly more than the time of one cycle of operation which would then be within the recording time of the next cycle of the operation of the sonar. Such a long delayed return of the reflected signal can be very confusing on the record and consequently causes a very serious noise problem.

There is also another noise problem. For example, when a strong reflected pulse comes back to the transmitter and to surface of the water and is again reflected downwardly to that strong reflector and back to the surface again the total delay may again be of the order of more than one operating cycle, and so this doubly reflected signal will be recorded with currently received returned signals from the second operation from the transducer.

Also under certain conditions where there is a lot of material in the water such as algae, plankton, moss and so forth, where sonic energy can be in a sense continually be reflected back and forth between these layers. The same situation may develop, namely, that a long delayed received signal will again be received in the succeeding operating cycle.

When any of these conditions occur it is important that the long delayed return signals be removed from the record in order to clarify the situation so far as the first reflected signals are concerned, which come back from reflecting interfaces which are in the zone of depth which is of principal interest to the operator of the sonar.

This invention has an important object, which is to overcome this difficulty by disabling the transmitter, detector and recorder during a second cycle of the operation and then on the third operation to enable them again to make proper record traces on every other cycle of operation.

SUMMARY OF THE INVENTION

It is a primary object of this invention to provide an improved sonar apparatus in which means are provided for disabling or suppressing the transmitter and transducer on any given cycle of operation, as well as the signal amplifier and recording element of the system, so that effectively the instrument is inactive for a complete cycle of the operation of the sonar.

This and other objects are realized and the limitations of the prior art are overcome in this invention by providing a control means which at the command of the operator, on any selected cycle of operation will disable the transmission portion of the sonar, and the recording portion of the sonar, so that no record is drawn during that elected cycle of operation. Generally the system will operate in a conventional manner during a first cycle, and then on the second, or alternate cycles, the transmission and recording features are disabled. On the third cycle the action is repeated again, and on the fourth cycle they are disabled again, and so on, so long as the conditions exist in the water which cause the problem of noise.

An additional feature is provided, which consists of slowing the motor which drives the record sheet so that successive marking traces of the stylus on the record sheet will be moved closer together, instead of leaving white spaces between the successive traces. When this improved operation is active, only alternate cycles will be recorded, and therefore, there will be white spaces between each of the recorded traces. This is eliminated by slowing down the drive motor to advance the record sheet by a reduced amount on each cycle of operation.

BRIEF DESCRIPTION OF THE DRAWINGS

These and other objects and advantages of this invention and a better understanding of the principle and details of the invention will be evident from the following description taken in conjunction with the appended drawing which represents in schematic fashion a sonar system to which is applied means to enable or disable the operation of the transmitter and transducer, as well as to enable or disable the high voltage source which marks the record sheet, and also to adjust the speed of the drive motor for the recording sheet.

DETAILED DESCRIPTION OF THE PREFERRED EMBODIMENT

Referring now to the drawing, there is shown in schematic fashion one embodiment of the invention indicated generally by the numeral 10. As in a conventional sonar, this illustration shows a transmitter 16 comprising an oscillator 18, power amplifier 20, and a transducer 22 which is a solid state device responsive to a voltage applied across it, which will expand in dimension and with release of that voltage will return in size to its original dimension. Thus, an oscillating voltage of high frequency placed across the transducer will cause it to oscillate in such a way that when inserted into the water below the bottom of the boat it will generate and transmit downwardly, pulses of sonic energy. These pulses will travel until they strike a reflecting interface which will reflect upwardly part of the energy arriving at the interface. This reflected energy travels upwardly again to the transducer, and its action is opposite to the transmission action. The reception of an oscillating sonic wave will cause the generation of a corresponding electrical oscillatory signal or reflected signals. This is then amplified and applied to a high voltage generator device to provide a marker voltage, which when applied by the stylus wire to the recording sheet will cause black marks in accordance with the presence of high voltages.

The term "cycle of operation" will be used which will indicate a period of time corresponding to the period of rotation of a belt 32 on the recording instrument indicated generally by the numeral 28. This belt 32 travels around a pair of rollers driven by an electric motor (not shown). It carries two elements, one is a magnet 31 and the other is a wire stylus 34. A pulser coil 40, which is a coil of wire, is positioned close to the surface of the belt so that as the magnet 31 moves close to the pulser coil 40 voltage will be generated in the coil. This voltage will travel by lead 41 to a wave shaping circuit 42 which is of conventional design and for the purpose of creating a square wave of sufficient voltage to control an electronic circuit. The output of the shaping circuit goes by lead 44 to a control device which can, for example, be an electronic circuit such as a micro-processor 12 or similar device. The operation of a micro-processor is well known, in that it contains a program which controls the sequence of operation of electronic circuits. These are controlled by inputs to the micro-processor from a keyboard 14 by means of conductors 13 and so on. The output of the wave shaping circuit, which is the pulse generated by the passage of the magnet past the pulser coil, initiates the operation of each cycle of the sonar. When this pulse on line 44 goes to the micro-processor it controls an enabling circuit 66 to send a voltage by lead 45 to an enabling circuit 66 which contains among other elements a capacitor 47 in series with line 45 which goes to the base of a transistor 50. A source of voltage V at 49 passes through the resistor 48 to the base of the transistor and in combination with the signal of the enable, operates the transistor as a switch which enables operation of the oscillator 18 of the transmitter or disables operation of the oscillator 18 in accordance with the setting on the keyboard.

The transistor 50 acts more or less as a switch to pass or not to pass voltage to the oscillator 18 and the power amplified 20 and the transducer 22 signalled from the enabled circuit 66.

The receiver 26 is blocked whenever the power is on the transducer; but as soon as the transmitted pulse is completed, the receiver 26 then becomes activated and the electrical reflected signal travels by leads 53 and 54 to the receiver 26 and then by lead 56 to the microprocessor and enabling circuits 58 and 60 by which the stylus is controlled. The amplified return reflected signal generates a high voltage singal which enables and passes by lead 64 to the recording device. Actvally, it goes to a metal plate 38 which is insulated and mounted in the plane of the paper 29 on the opposite side of the belt 32 from the recording paper 29. The stylus is a bent wire device which is mounted on the belt and has extensions to the sides so that a single piece of wire is continually in contact with the stylus pickup plate 38 as well as the surface of the recording sheet 29. Thus, whatever electrical signal is returned as a result of the reflection of a sonic pulse provides a high output voltage which by means of the stylus is used to mark the paper or other recording web 29.

The recording web 29 is coated with a chemical substance such that when a high voltage electrode is pressed against the surface of the chemical substance the passage of current will cause combustion of some chemical material which will leave a black residue. Thus, a pointed stylus will leave a small diameter black mark whenever a high voltage is impressed on the stylus and from the stylus to the recording sheet.

The enabling circuit 60 has a transistor 72 which acts as a switch to control a second transistor 74 to switch a high voltage source 62 and capacitor 70 through transistor 74 to the stylus 34.

Reviewing what has been said, the belt 32 of the recorder carries a magnet which in cooperation with the pulsor coil 40 generates a starting pulse properly shaped by means 42 and this controls an enabling circuit which is used to enable both the transmitter and the transducer and also the receiver and the stylus voltage generator so as to mark the recording paper.

On command the enabling circuit 46 which can be a simple counter, can be set from enable to disable on alternate cycles of operation. When this is done, a first cycle set by the belt will enable all operations and a record trace will be made. Then on the second cycle the enabling means 46 disables or suppresses the action of the transmitter and transducer and also the operation of the received signal stylus voltage generator so that no mark is made on the paper, then on the third cycle of operation all operations are then enabled again and so on.

There is a further lead 66A from the enable means 46 that goes by lead 66A and 66 to the drive motor 68 which drives the take up roller of the recording sheet 29 of the recorder 28. The enabling means 46, such as on the second cycle, disables the transmitter and transducer also disables the reflected signal stylus voltage generator 60, and also provides a reduced voltage on lead 66A and 66 to the motor 68 which provides causes it to run at a reduced speed in order to reduce the spacing between alternate recorded traces. By means of these features the quality of the record is greatly improved. When the nature of the water through which the sonar is operating clears up and the disabling feature is no longer necessary, the proper control is sent to the enabling device 46 and it now is disabled and permits operation of the transmitter and transducer as well as the received signal circuitry to provide the normal operating conditions for the sonar.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In a sonar apparatus for use on a boat to indicate by the reception of reflected sonic energy the presence of sonic reflection interfaces, and to record on a moving recording web across which a recording stylus is moved by a continuously rotating belt, including means responsive to said moving belt to produce a cycle starting signal, means responsive to said cycle starting signal to enable an electrical oscillator and power amplifier to transmit to a sonic transducer a high frequency pulse of electrical energy to cause said transducer to emit a downgoing sonic pulse, means connected to said transducer for detecting return reflection signals and for amplifying said reflection signals for generating high voltage pulses, and means to apply said pulses to said stylus and to said web, the improvement comprising:
   (a) means on command to disable said electrical oscillator and power amplifier on at least each alternate cycle providing a disabling mode;
   (b) means to disable said means for generating high voltage pulses on at least each alternate cycle in synchronism with the disabling of said oscillator and power amplifier during said disabling mode; and
   (c) means to slow down the rate of movement of said web when said apparatus is operating in the disabling mode.

* * * * *